(12) United States Patent
Jung

(10) Patent No.: US 9,990,076 B2
(45) Date of Patent: Jun. 5, 2018

(54) TOUCH SCREEN APPARATUS

(71) Applicant: SAMSUNG ELECTRONICS CO., LTD., Suwon-si (KR)

(72) Inventor: Chang Joo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 14/808,578

(22) Filed: Jul. 24, 2015

(65) Prior Publication Data

US 2016/0085361 A1  Mar. 24, 2016

(30) Foreign Application Priority Data

Sep. 18, 2014 (KR) ........................ 10-2014-0124356

(51) Int. Cl.

| | | |
|---|---|---|
| *G06F 3/045* | (2006.01) | |
| *G06F 3/041* | (2006.01) | |
| *G06F 3/0354* | (2013.01) | |
| *G06F 3/046* | (2006.01) | |
| *G06F 3/0488* | (2013.01) | |

(52) U.S. Cl.
CPC ........ *G06F 3/0416* (2013.01); *G06F 3/03545* (2013.01); *G06F 3/046* (2013.01); *G06F 3/04883* (2013.01)

(58) Field of Classification Search
CPC .... G06F 3/03545; G06F 3/0416; G06F 3/046; G06F 3/04883
See application file for complete search history.

(56) References Cited

U.S. PATENT DOCUMENTS

| | | | |
|---|---|---|---|
| 2013/0002614 A1* | 1/2013 | Nowatzyk | G06F 3/0488 345/179 |
| 2014/0082563 A1* | 3/2014 | Kim | G06F 3/0482 715/835 |
| 2014/0168175 A1* | 6/2014 | Mercea | G06F 3/03545 345/179 |

* cited by examiner

*Primary Examiner* — Insa Sadio
(74) *Attorney, Agent, or Firm* — Sughrue Mion, PLLC

(57) ABSTRACT

Disclosed herein is a touch screen apparatus including a touch screen having a geomagnetic sensing function and a near-field communication (NFC) function and configured to calculate touched coordinates using a touch input signal when the touch input signal is generated as a location on a touch panel is touched by a touch screen electronic pen after the touch screen is powered on; the touch screen electronic pen having an NFC function, and configured to take notes on the touch panel according to a user's manipulation and transmit the touched coordinates calculated by the touch screen to a main central processor; and the main central processor having an NFC function, and configured to receive the touched coordinates from the touch screen electronic pen and output characters corresponding to the touched coordinates onto the touch panel.

4 Claims, 13 Drawing Sheets

TOUCH SCREEN APPARATUS

CROSS-REFERENCE TO RELATED APPLICATION

This application claims the priority from Korean Patent Application No. 10-2014-0124356, filed on Sep. 18, 2014 in the Korean Intellectual Property Office, the entire disclosure of which is incorporated herein by reference.

BACKGROUND

1. Field

Exemplary embodiments relate to a touch screen apparatus.

2. Description of Related Art

In general, a touch screen is an apparatus which generates a signal corresponding to coordinates of a touched location on the touch screen.

Such touch screens may be classified into various types, such as an infrared ray sensor type, a capacitive sensor type, etc., according to a method of recognizing a touched location thereon.

In particular, in the case of an infrared ray sensor type touch screen, a touch of a location on the touch screen may be sensed using a light-emitting device that emits infrared rays and a light-receiving device that receives the infrared rays. A signal may be generated corresponding to the coordinates of the touched location. More specifically, the infrared ray sensor type touch screen includes a light-emitter that emits infrared rays and a receiver that receives the infrared rays emitted from the light-emitter. When infrared rays are emitted and received, an infrared ray matrix is formed.

Then, when a location on the touch screen is touched by a user, an infrared ray corresponding to the touched location is blocked, the blocking of the infrared ray is sensed, and the coordinates of the touched location are calculated.

SUMMARY

Various aspects will be set forth in part in the description which follows and, in part, will be obvious from the description, or may be learned by practice of the invention.

In accordance with one aspect of the present invention, a touch screen apparatus includes a touch screen having a geomagnetic sensing function and a near-field communication (NFC) function, and configured to calculate touched coordinates using a touch input signal when the touch input signal is generated as a location on a touch panel is touched by a touch screen electronic pen after the touch screen is powered on; the touch screen electronic pen having an NFC function, and configured to take notes on the touch panel according to a user's manipulation and transmit the touched coordinates calculated by the touch screen to a main central processing central processor; and the main central processor having an NFC function, and configured to receive the touched coordinates from the touch screen electronic pen and output characters corresponding to the touched coordinates onto the touch panel.

The touch screen electronic pen may include a permanent magnet. The touch screen may include the touch panel; an NFC module configured to establish NFC; a power supply configured to supply power; a sensor module having a geomagnetic sensing function, and configured to sense a touch using a magnetic field formed between the sensor module and the permanent magnet of the touch screen electronic pen; a coordinates calculator configured to calculate touched coordinates of the touch screen electronic pen that is in contact with the touch panel, based on preset coordinate data of each location; and a memory configured to store coordinate data of each location on the touch panel and information related to the touch screen.

The main central processor may include an NFC module configured to establish NFC; a coordinates receiver configured to receive the touched coordinates from the touch screen electronic pen; and a character outputter configured to output characters corresponding to the touched coordinates onto the touch screen.

The touch screen electronic pen may include a power switch configured to switch a power supply to an on-state or an off-state; a permanent magnet disposed adjacent to the touched location on the touch panel; an NFC module configured to establish NFC; and a coordinate transmitter configured to transmit the touched coordinates received from the touch screen to the main central processor.

In accordance with another aspect of the present invention, a touch screen apparatus includes a touch screen having a geomagnetic sensing function and a near-field communication (NFC) function, and configured to calculate touched coordinates using a touch input signal and output characters corresponding to the touched coordinates onto a touch panel when the touch input signal is generated as a location on the touch panel is touched by a touch screen electronic pen after the touch screen is powered on; and the touch screen electronic pen including a permanent magnet disposed adjacent to the touched location on the touch panel, and configured to take notes on the touch panel according to a user's manipulation.

The touch screen may include the touch panel; an NFC module configured to establish NFC; a power supply configured to supply power; a sensor module having a geomagnetic sensing function, and configured to sense a touch using a magnetic field formed between the sensor module and the permanent magnet of the touch screen electronic pen; a coordinate calculator configured to calculate touched coordinates of the touch screen electronic pen which is in contact with the touch panel, based on preset coordinate data of each location; a character outputter configured to output characters corresponding to the touched coordinates calculated by the coordinate calculator; and a memory configured to store coordinate data of each location on the touch panel and information related to the touch screen.

The touch screen electronic pen may include a power switch configured to switch a power supply to an on-state or an off-state; and the permanent magnet disposed adjacent to the touched location on the touch panel.

In accordance with another aspect of the present invention, a touch screen apparatus includes a touch screen having a near-field communication (NFC) function; a sub-board having a geomagnetic sensing function and an NFC function, and configured to calculate coordinates of a touched location on a touch panel based on preset coordinate data of each location when a touch input signal is generated as the location on the touch panel is touched by a sub-board electronic pen after the sub-board is powered on; the sub-board electronic pen having an NFC function, and configured to take notes on the touch panel according to a user's manipulation after a power switch is on and transmit the coordinates of the touched location received from the sub-board to a main central processor; and the main central processor having an NFC function, and configured to receive the coordinates of the touched location from the sub-board electronic pen and output characters corresponding to the coordinates of the touched location onto the touch screen.

When a plurality of sub-board electronic pens are used, the main central processor may output characters onto the touch screen, based on touched coordinates of a sub-board electronic pen which transmits a power switch-on signal among the plurality of sub-board electronic pens.

The sub-board electronic pen may include an NFC module configured to establish NFC; the power switch configured to switch a power supply to an on-state or an off-state; a writing object informer configured to transmit a writing object informing signal to the main central processor as the power supply is switched to the on-state; a permanent magnet disposed adjacent to the touched location on the touch panel; and a transmitter configured to transmit the coordinates of the touched location to the main central processor.

When a plurality of sub-board electronic pens are used, the main central processor may include an NFC module configured to establish NFC; a writing object recognizer configured to recognize as a writing object a sub-board electronic pen which transmits the writing object informing signal among the plurality of sub-board electronic pens; a coordinate receiver configured to receive the coordinates of the touched location from the sub-board electronic pen; and a character outputter configured to output characters corresponding to the coordinates of the touched location onto the touch screen.

When writing object informing signals are received from the plurality of sub-board electronic pens, the writing object recognizer may select a writing object, according to the order in which the writing object information signals are received.

The sub-board may include a computer monitor, a notebook computer, a tablet personal computer (PC), a whiteboard, and a mobile phone which have a touch function.

In accordance with another aspect of the present invention, a touch screen apparatus includes a touch screen having a near-field communication (NFC) function and configured to receive touched coordinates from a sub-board electronic pen and output characters corresponding to the touched coordinates; a sub-board having a geomagnetic sensing function and an NFC function, and configured to calculate coordinates of a touched location on a touch panel of the sub-board based on preset coordinate data of each location, when a touch input signal is generated as the location on the touch panel is touched by the sub-board electronic pen after the touch screen is powered on; and the sub-board electronic pen having an NFC function, and configured to take notes on the touch panel according to a user's manipulation and transmit to the touch screen the coordinates of the touched location received from the sub-board after a power switch is on.

The sub-board electronic pen may include an NFC module configured to establish NFC; the power switch configured to switch a power supply to an on-state or an off-state; a writing object informer configured to transmit a writing object informing signal to the touch screen as the power supply is switched to the on-state; a permanent magnet disposed adjacent to the touched location on the touch panel of the sub-board; and a coordinate transmitter configured to transmit the coordinates of the touched location to the touch screen.

When a plurality of sub-board electronic pens are used, the touch screen may include a touch screen touch panel; an NFC module configured to establish NFC; a power supply configured to supply power; a writing object recognizer configured to recognize as a writing object a sub-board electronic pen which transmits a writing object informing signal among the plurality of sub-board electronic pens; a coordinate receiver configured to receive touched coordinates from the sub-board electronic pen; and a character outputter configured to output characters corresponding to the touched coordinates received from the sub-board electronic pen onto the touch screen touch panel.

When writing object informing signals are received from the plurality of sub-board electronic pens, the writing object recognizer may select a writing object according to the order in which the writing object informing signals are received.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
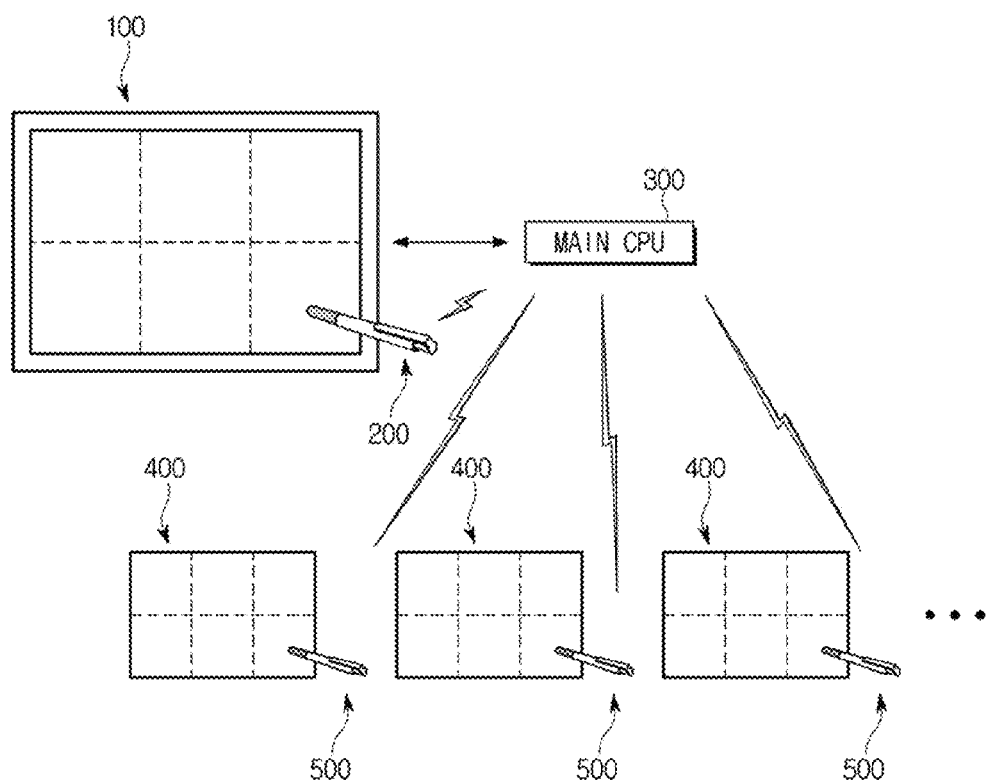
FIG. 1 is a diagram illustrating the relationship between elements of a touch screen apparatus in accordance with an exemplary embodiment.

The above and/or other aspects will become apparent and more readily appreciated from the following description of exemplary embodiments, taken in conjunction with the accompanying drawings. In the present disclosure, similar elements are assigned the same or similar reference numerals even in different drawings if possible. In the following description, well-known functions or constructions may not be described in detail so as to not obscure the disclosure with unnecessary detail. As used herein, the terms 'first', 'second', 'third', etc. are used to distinguish one element, component, region, layer or section from another element, component, region, layer or section. Thus, these elements, components, regions, layers and/or sections should not be limited by these terms. Expressions such as "at least one of,"

when preceding a list of elements, modify the entire list of elements and do not modify the individual elements of the list.

Hereinafter, exemplary embodiments will be described in detail with reference to the accompanying drawings.

FIG. 1 is a diagram illustrating the relationship between elements of a touch screen apparatus in accordance with an exemplary embodiment.

As illustrated in FIG. 1, the touch screen apparatus may include a touch screen 100 having a touch function corresponding to a main board, an electronic pen 200 configured to take notes on the touch screen 100 by inputting a touch signal to the touch screen 100, a main central processor (CPU) 300 that performs a control function to generate characters on the touch screen 100, a subordinate touch screen 400 having a touch function, and an electronic pen 500 configured to take notes on the subordinate touch screen 400.

As illustrated in FIG. 1, a plurality of subordinate touch panels 400 may be provided, and thus a corresponding plurality of electronic pens 500 may be also provided.

The touch screen 100, the electronic pen 200, the main CPU 300, the subordinate touch screen 400, and the electronic pen 500 may each have a near-field communication (NFC) function. In an initial stage, communication may be established among the various components based on specific identification information. Thus, data may be exchanged among the touch screen 100, the electronic pen 200, the main CPU 300, the subordinate touch screen 400, and the electronic pen 500. The data may be used to output notes, which are taken on the touch screen 100 or the subordinate touch screen 400, onto the touch screen 100.

For example, the touch screen 100 may be a relatively large-sized display having a touch sensing function, such as a television, a monitor, or a whiteboard, and installed in a classroom, a lecture room, a theater, etc.

Also, the subordinate touch screen 400 may be a portable display having a touch sensing function, such as a computer monitor, a notebook computer, a tablet personal computer (PC), a whiteboard, a mobile phone, etc.

As illustrated in FIG. 1, the touch screen 100, the electronic pen 200, the main CPU 300, the subordinate touch screen 400, and the electronic pen 500 may be relatively close, so that NFC communication may be established, but are not limited thereto.

Hereinafter, exemplary embodiments employing elements of the touch screen apparatus of FIG. 1 in various combinations will be described below.

Figure 2:
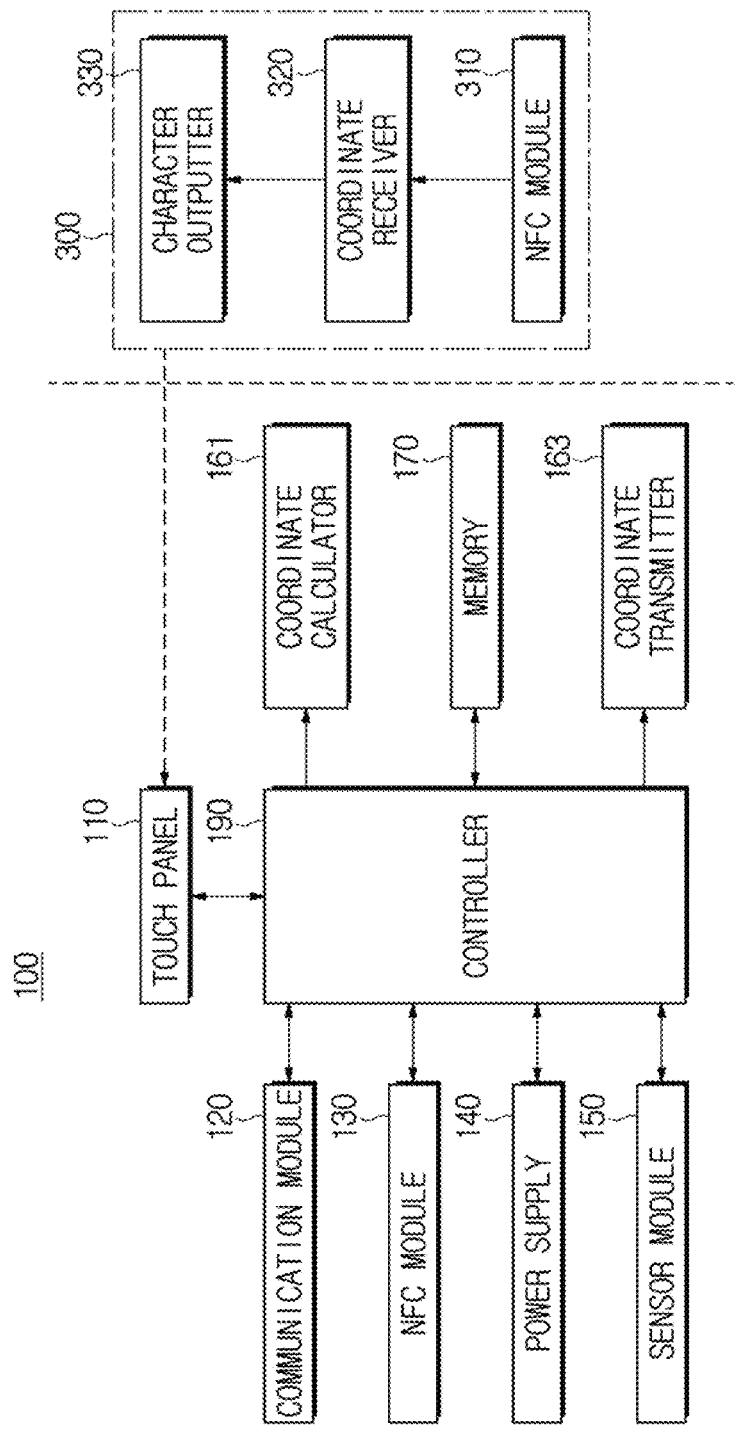
FIG. 2 is a block diagram of a main touch screen in accordance with another exemplary embodiment.
Figure 6:
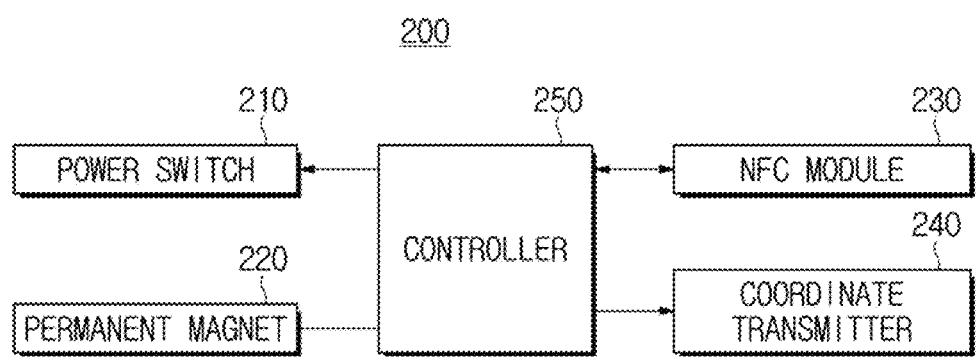
FIG. 6 is a block diagram of an electronic pen in accordance with another exemplary embodiment.

FIG. 2 is a block diagram of a touch screen 100 and a main CPU 300 in accordance with an exemplary embodiment. FIG. 6 is a block diagram of an electronic pen 200. An exemplary embodiment in which the touch screen 100 and the main CPU 300 are separated will be described below.

The touch screen apparatus may include the touch screen 100, the electronic pen 200, and the main CPU 300.

The touch screen 100 may have a geomagnetic sensing function and an NFC function. After the touch screen 100 is powered on, the touch screen 100 may calculate touched coordinates by analyzing a touch input signal generated when a location on a touch panel 110 is touched by the electronic pen 200.

As illustrated in FIG. 2, the touch screen 100 may include the touch panel 110, a communication module 120, an NFC module 130, a power supply 140, a sensor module 150, a coordinate calculator 161, a memory 170, a coordinate transmitter 163, and a controller 190.

The communication module 120 is configured to establish communication. Communication may be wired or wireless. The communication module 120 may establish wireless communication outside an NFC range, for example, via Bluetooth or Wi-Fi, and establish wired communication to transmit information converted into an electrical or optical signal via a communication line such as a pair cable, a coaxial cable, an optical fiber cable, etc.

The NFC module 130 is configured to establish NFC, and the communication module 120 may establish communication, for example, via Bluetooth, Wi-Fi, etc.

The power supply 140 is configured to supply power, and may supply power to the touch screen 100 under control of the controller 190. The power supply 140 may supply power to the touch screen 100 from an external power source via a wired cable connected to a connector of the touch screen 100, or supply power to a battery embedded in the touch screen 100.

The sensor module 150 may have a geomagnetic sensing function, and sense a touch on the touch panel 110 using a magnetic field formed between the sensor module 150 and a permanent magnet included in the electronic pen 200. For example, the sensor module 150 may be in a geomagnetic-sensor integrated circuit (IC) form, and detect a point of the compass using a magnetic field formed between the sensor module 150 and the permanent magnet of the electronic pen 200.

When the electronic pen 200 including the permanent magnet approaches the touch screen 100 or the subordinate touch screen 400, a screen may be changed or an image may deteriorate due to a magnetic field. In this case, the sensor module 150 may prevent screen change or image deterioration from occurring by compensating for a sensitivity of sensing by adding an offset to the sensitivity of sensing, under control of the controller 190. For example, when a power transformer operates near a region to which a sensor IC is assigned, a magnetic field is formed and thus the intensity of a geomagnetic field changes. In this case, the sensitivity of a sensor is compensated for by adding an offset thereto. This may apply to one or both of the touch screen 100 and subordinate touch screen 400, as will be described below.

Figure 10:
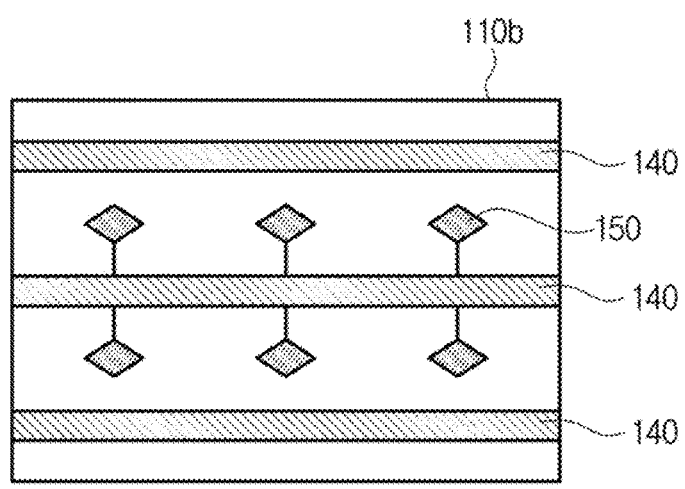

As illustrated in FIG. 10, a plurality of sensor modules 150 may be provided to more precisely recognize a location on the touch panel 110 (which is larger than the subordinate touch screen 400) touched by the electronic pen 200. In this case, the touched location may be detected by a corresponding sensor module 150.

The coordinate calculator 161 may calculate touched coordinates of the electronic pen 200 in contact with the touch panel 110, based on preset coordinate data of each location. For example, the coordinate calculator 161 calculates the touched coordinates of the electronic pen 200 on the touch panel 110 by comparing the touched location recognized by the sensor module 150 with preset coordinates of each location on the touch panel 110.

If the touch screen 100 includes a speaker that includes a magnet, the coordinate calculator 161 may obtain an initial value of a magnetic field from the magnet of the speaker, and compensate for a resultant value obtained by the electronic pen 200. Thus, an effect of a magnetic field caused by the speaker may be prevented from interfering. This may also apply to calculating the coordinates of a touched location on the subordinate touch screen 400, as will be described below.

The memory 170 may store coordinate data of each location on the touch panel 110 and information related to the touch screen 100.

Examples of the memory 170 may include, but are not limited to, a nonvolatile memory that permanently stores information, such as a magnetic disk, a semiconductor disk (a solid-state disk), a read-only memory (ROM), an erasable programmable read-only memory (EPROM), an electrically erasable programmable read-only memory (EEPROM), etc.; and a volatile memory that temporarily stores temporary data, such as a dynamic random access memory (DRAM), a static RAM (SRAM), etc.

The coordinate transmitter 163 may transmit the touched coordinates calculated by the coordinate calculator 161 to the electronic pen 200.

The electronic pen 200 may have an NFC function, be configured to take notes on the touch panel 110 through a user's manipulation, and transmit the touched coordinates calculated by the touch screen 100 to the main CPU 300.

As illustrated in FIG. 6, the electronic pen 200 may include a power switch 210, a permanent magnet 220, an NFC module 230, a coordinate transmitter 240, and a controller 250.

Figure 9:
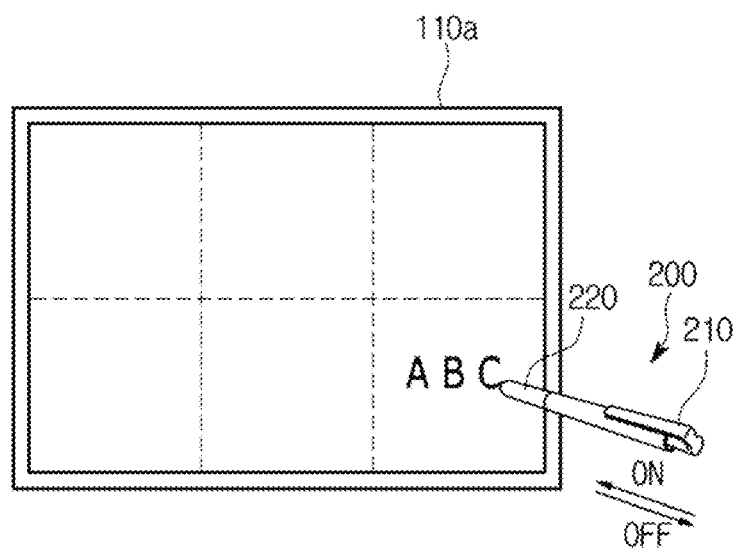
FIGS. 9 and 10 are diagrams illustrating methods of controlling a touch panel in accordance with exemplary embodiments.

The power switch 210 is configured to switch a power supply to an 'on' state or an 'off' state, and may be installed on a side of the electronic pen 200 so that a user may easily turn on or off the power switch 210, as illustrated in FIG. 9, but is not limited thereto.

As illustrated in FIG. 9, the permanent magnet 220 may be located adjacent to a touched location on a touch panel 110a, so that the distance between the sensor module 150 and the permanent magnet 220 on the touch screen 100 may be minimized to improve the efficiency of geomagnetic sensing.

The NFC module 230 is configured to establish NFC, and may establish communication, for example, via Bluetooth, Wi-Fi, etc.

The coordinate transmitter 240 may transmit touched coordinates received from the touch screen 100 to the main CPU 300. A subject that transmits the touched coordinates to the main CPU 300 is not limited to the electronic pen 200. The touch screen 100 may additionally include the coordinate transmitter 163 to directly transmit the touched coordinates to the main CPU 300.

Although not shown, the electronic pen 200 may include a power supply such as a battery.

The main CPU 300 may include an NFC function, receive touched coordinates from the electronic pen 200 and output characters corresponding to the touched coordinates onto the touch panel 110.

As illustrated in FIG. 2, the main CPU 300 may include an NFC module 310, a coordinate receiver 320, and a character outputter 330.

The NFC module 310 may be configured to establish NFC.

The coordinate receiver 320 may receive touched coordinates from the electronic pen 200. If the touched coordinates are transmitted from the touch screen 100, the coordinate receiver 320 may also receive the touched coordinates from the touch screen 100.

The character outputter 330 may output characters corresponding to the touched coordinates onto the touch screen 100.

An exemplary embodiment in which a touch screen apparatus includes the touch screen 100 and the electronic pen 200 will be described below.

Figure 3:
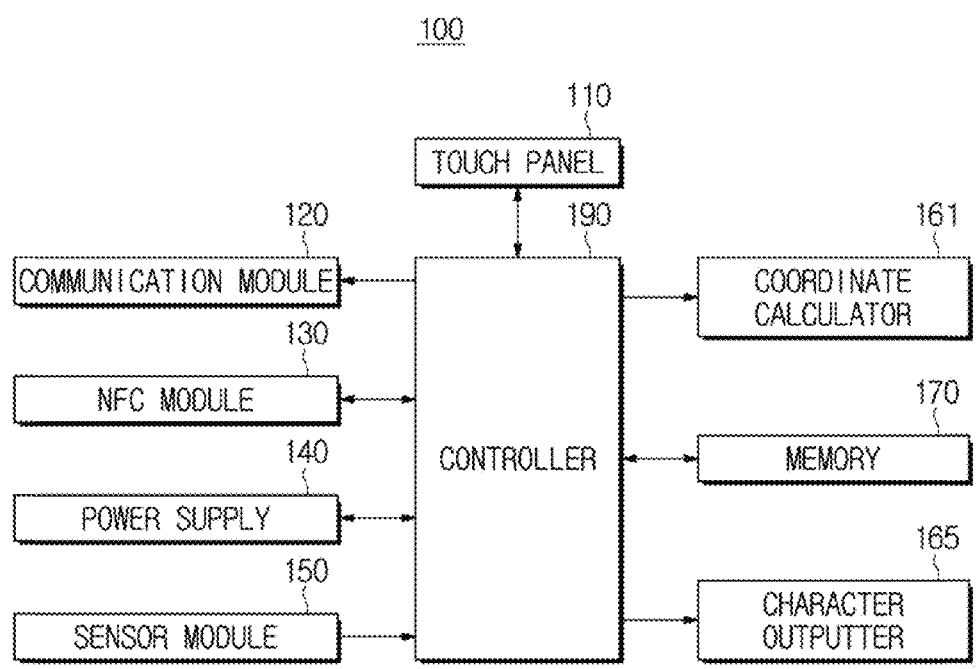
FIG. 3 is a block diagram of a touch screen in accordance with another exemplary embodiment.

FIG. 3 is a block diagram of a touch screen 100 in accordance with an exemplary embodiment, in which the touch screen 100 has a function of a main CPU.

The touch screen 100 has a geomagnetic sensing function and an NFC function. After the touch screen 100 is powered on, when a touch input signal is generated as a location on a touch panel 110 is touched by the electronic pen 200 of FIG. 1, the coordinates of the touched location may be calculated using the touch input signal and characters corresponding to the calculated coordinates may be output onto the touch panel 110.

Referring to FIG. 3, the touch screen 100 may include the touch panel 110, a communication module 120, an NFC module 130, a power supply 140, a sensor module 150, a coordinate calculator 161, a memory 170, a character outputter 165, and a controller 190.

The communication module 120 is configured to establish wired/wireless communication. The communication module 120 may establish wireless communication outside the range of NFC, for example, via Bluetooth or Wi-Fi, and establish wired communication to transmit information converted into an electrical or optical signal via a communication line such as a pair cable, a coaxial cable, an optical fiber cable, etc.

The NFC module 130 is configured to establish NFC, and may establish communication, for example, via Bluetooth, Wi-Fi, etc.

The power supply 140 is configured to supply power, and may supply power to the touch screen 100 under control of the controller 190.

The sensor module 150 may have a geomagnetic sensing function, and sense a touch using a magnetic field formed between the sensor module 150 and the permanent magnet of the electronic pen 200. For example, the sensor module 150 may be in the form of a geomagnetic-sensor IC, and detect a point of the compass using a magnetic field formed between the sensor module 150 and the permanent magnet 220 embedded in the electronic pen 200.

The coordinate calculator 161 may calculate touched coordinates of the electronic pen 200 that is in contact with the touch panel 110, based on preset coordinate data of each location.

The character outputter 165 may output characters corresponding to the touched coordinates calculated by the coordinate calculator 161. As illustrated in FIG. 9, the character outputter 165 may output characters onto the touch panel 110.

The memory 170 may store coordinate data of each location on the touch panel 110 and information related to the touch screen 100.

Examples of the memory 170 may include, but are not limited to, a nonvolatile memory that permanently stores information, such as a magnetic disk, a semiconductor disk (a solid-state disk), a ROM, an EPROM, an EEPROM, etc.; and a volatile memory that temporarily stores temporary data, such as a DRAM, a SRAM, etc.

As illustrated in FIG. 9, the permanent magnet 220 of the electronic pen 200 may be located adjacent to a touched location on the touch panel 110 so as to take notes on the touch panel 110 through a user's manipulation.

Referring to FIG. 6, the electronic pen 200 may include the power switch 210 that switches a power supply to an 'on' state or an 'off' state, and the permanent magnet 220 disposed adjacent to a touched location on the touch panel 110.

An exemplary embodiment in which a touch screen apparatus includes a touch screen 100, a main CPU 300, a subordinate touch screen 400, and an electronic pen 500 will be described below with reference to FIGS. 4, 7, 8, and 11.

Figure 4:
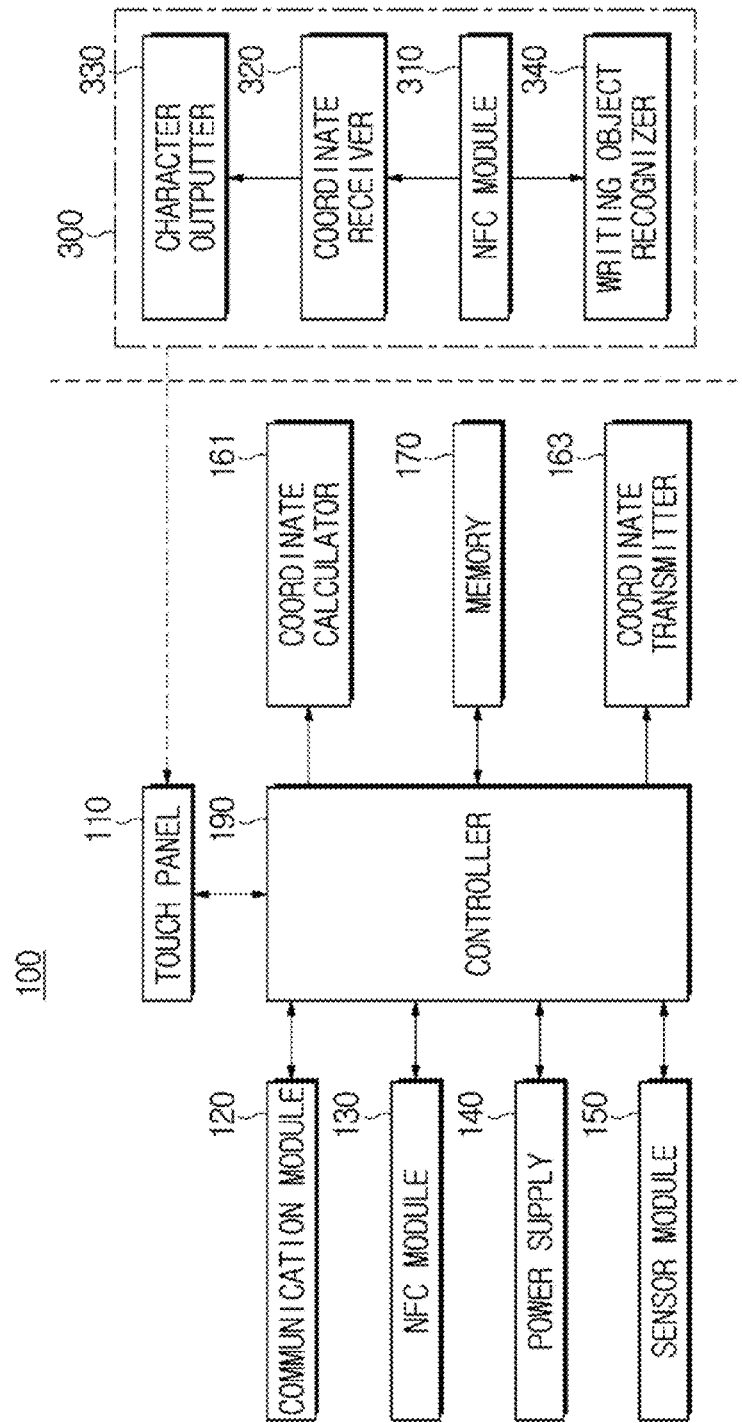
FIG. 4 is a block diagram of a touch screen and a main CPU in accordance with another exemplary embodiment.
Figure 7:
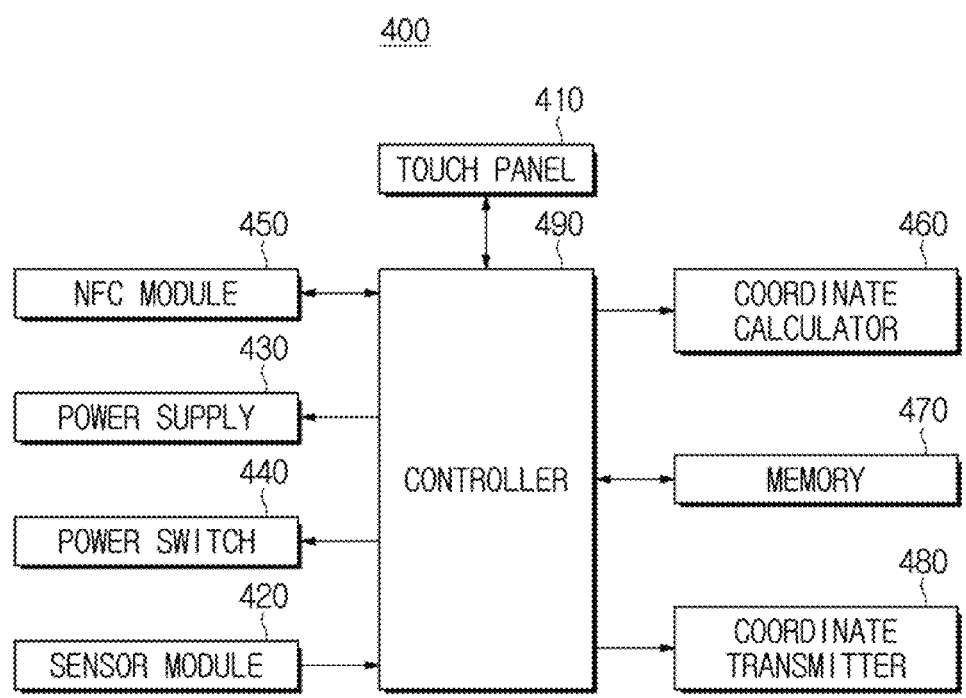
FIG. 7 is a block diagram of a subordinate touch panel in accordance with another exemplary embodiment.
Figure 8:
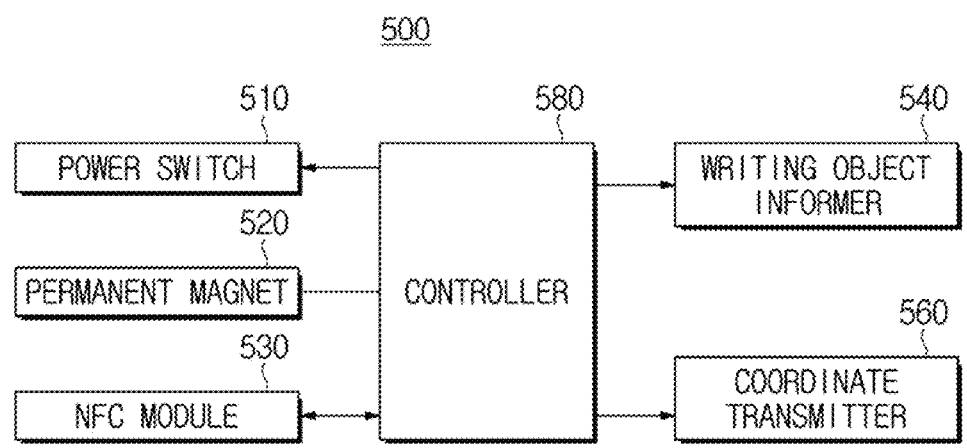
FIG. 8 is a block diagram of an electronic pen in accordance with another exemplary embodiment.
Figure 11:
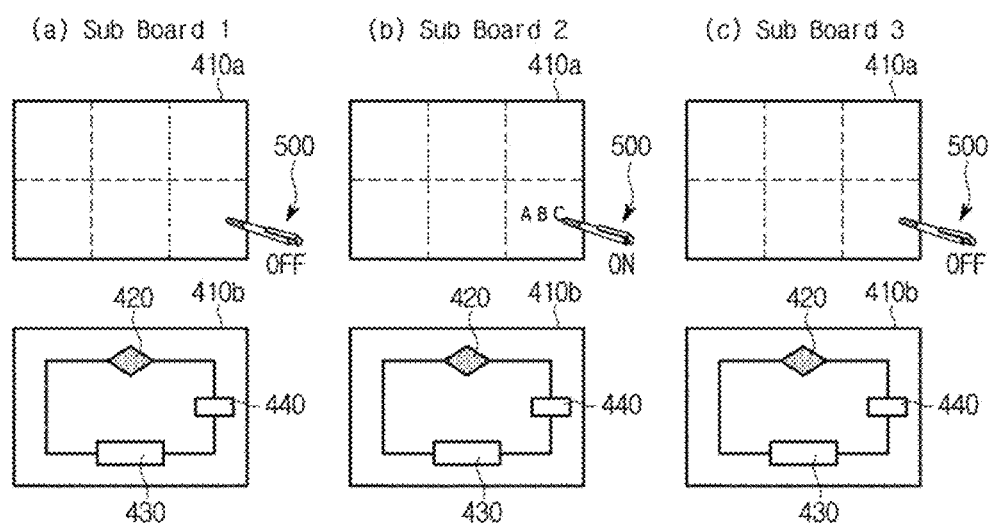
FIG. 11 is a diagram illustrating a method of controlling a subordinate touch panel in accordance with another exemplary embodiment.

FIG. 4 is a block diagram of a touch screen 100 and a main CPU 300 in accordance with another exemplary embodiment. FIG. 7 is a block diagram of a subordinate touch screen 400. FIG. 8 is a block diagram of an electronic pen 500. FIG. 11 is a diagram illustrating a method of controlling a subordinate touch screen in accordance with an exemplary embodiment.

The touch screen 100 may have an NFC function.

As illustrated in FIG. 4, the touch screen 100 may include a touch panel 110, a communication module 120, an NFC module 130, a power supply 140, a sensor module 150, a coordinate calculator 161, a coordinate transmitter 163, a memory 170, and a controller 190. These elements are as described above with reference to FIG. 2 and thus are not described again here.

Referring to FIGS. 7 and 11, the subordinate touch screen 400 may have a geomagnetic sensing function and an NFC function. After the subordinate touch screen 400 is powered on, when a touch input signal is received as a location on a touch panel 410 is touched by the electronic pen 500, touched coordinates of the electronic pen 500 that is in contact with the touch panel 410 may be calculated. Examples of the subordinate touch screen 400 may include, but are not limited to, a computer monitor, a notebook computer, a tablet PC, a whiteboard, and a mobile phone which have a touch function.

More specifically, the subordinate touch screen 400 may include the touch panel 410, an NFC module 450, a power supply 430, a power switch 440, a sensor module 420, a coordinate calculator 460, a memory 470, a coordinate transmitter 480, and a controller 490.

As illustrated in FIG. 11, the touch panel 410 may include a touch panel 410*a* on which notes may be taken while interacting with the electronic pen 500, the sensor module 420 having a geomagnetic sensing function, the power supply 430, and a touch panel 410*b* to which the power switch 440 is attached and which is combined with the touch panel 410*a*.

The NFC module 450 is configured to establish NFC, and may establish communication, for example, via Bluetooth, Wi-Fi, etc.

The power supply 430 is configured to supply power, and may supply power to the subordinate touch screen 400 under control of the controller 490. When the subordinate touch screen 400 has a small size similar to a portable terminal, the power supply 430 may be in the form of a battery 430 of FIG. 11.

The power switch 440 may be configured to switch a power supply to an 'on' state or an 'off' state.

The sensor module 420 may have a geomagnetic sensing function and thus sense a touch via a magnetic field formed between the sensor module 420 and the permanent magnet of the electronic pen 500. For example, the sensor module 420 may be a geomagnetic-sensor IC, and detect a touch point using a magnetic field formed between the sensor module 420 and the permanent magnet embedded in the electronic pen 500.

The coordinate calculator 460 may calculate touched coordinates of the electronic pen 500 that is in contact with the touch panel 410, based on preset coordinate data of each location. For example, the coordinate calculator 460 calculates the touched coordinates of the electronic pen 500 on the touch panel 410 by comparing the touched location recognized by the sensor module 420 with coordinates preset to correspond to each location on the touch panel 410. In this case, of each location on the touch screen 100 may be set to correspond to the touch panel 410 of the subordinate touch screen 400, and may be scaled to the size of the touch screen 100 and displayed when notes taken on the subordinate touch screen 400 are output onto the touch screen 100.

The memory 470 may store the coordinate data of each location on the touch panel 410 and information related to the subordinate touch screen 400.

The coordinate transmitter 480 may transmit the touched coordinates calculated by the coordinate calculator 460 to the main CPU 300 using the electronic pen 500.

Also, as illustrated in FIG. 11, a plurality of subordinate touch panels 400 may be provided.

The electronic pen 500 may have an NFC function. After a power switch 510 of the electronic pen 500 is on, the electronic pen 500 may be used to take notes on the touch panel 410 according to a user's manipulation, and transmit touched coordinates received from the subordinate touch panel 200 to the main CPU 300.

As illustrated in FIG. 8, the electronic pen 500 may include the power switch 510, a permanent magnet 520, an NFC module 530, a writing object informer 540, a coordinate transmitter 560 and a controller 580.

The power switch 510 may switch a power supply to an 'on' state or an 'off' state.

The permanent magnet 520 may be located adjacent to a touched location on the touch panel 410 so that the distance between the sensor module 420 of FIG. 10 and the permanent magnet 520 on the touch panel 410*b* may be minimized to improve the efficiency of geomagnetic sensing, but is not limited thereto.

The NFC module 530 may be configured to establish NFC.

If the power supply is switched to the 'on' state, the writing object informer 540 may transmit a writing object informing signal to the main CPU 300 when an electronic pen and one of the plurality of subordinate touch panels 400 are disposed within a range of an NFC. Although not shown, the electronic pen 200 may also have a function of transmitting a writing object informing signal.

The coordinate transmitter 560 may transmit the calculated touched coordinates to the main CPU 300.

The main CPU 300 may have an NFC function, and receive touched coordinates from the electronic pen 500 and output characters corresponding to the touched coordinates onto the touch screen 100.

As illustrated in FIG. 11, when a plurality of electronic pens 500 are used, the main CPU 300 outputs characters onto the touch screen 100, based on the touched coordinates of an electronic pen 500 that transmits a power switch 'on' signal (a writing object informing signal) among the plurality of electronic pens 500.

As illustrated in FIG. 4, the main CPU 300 may include an NFC module 310, a coordinate receiver 320, a character outputter 330, and a writing object recognizer 340.

The NFC module 310 may be configured to establish NFC.

The coordinate receiver 320 may receive touched coordinates from the electronic pen 500.

The character outputter 330 may output characters corresponding to the touched coordinates onto the touch screen 100.

The writing object recognizer 340 may recognize as a writing object an electronic pen 500 that transmits a writing object informing signal among the plurality of electronic pens 500. That is, the writing object recognizer 340 may output characters onto the touch screen 100 using touched coordinates transmitted from a writing object selected by the writing object recognizer 340.

When writing object informing signals are received from a plurality of electronic pens 500, the writing object recognizer 340 may select a writing object according to the order in which the writing object informing signals are received.

An exemplary embodiment in which a touch screen apparatus includes the touch screen 100, the subordinate touch screen 400, and the electronic pen 500 will be described with reference to FIG. 5 below.

Figure 5:
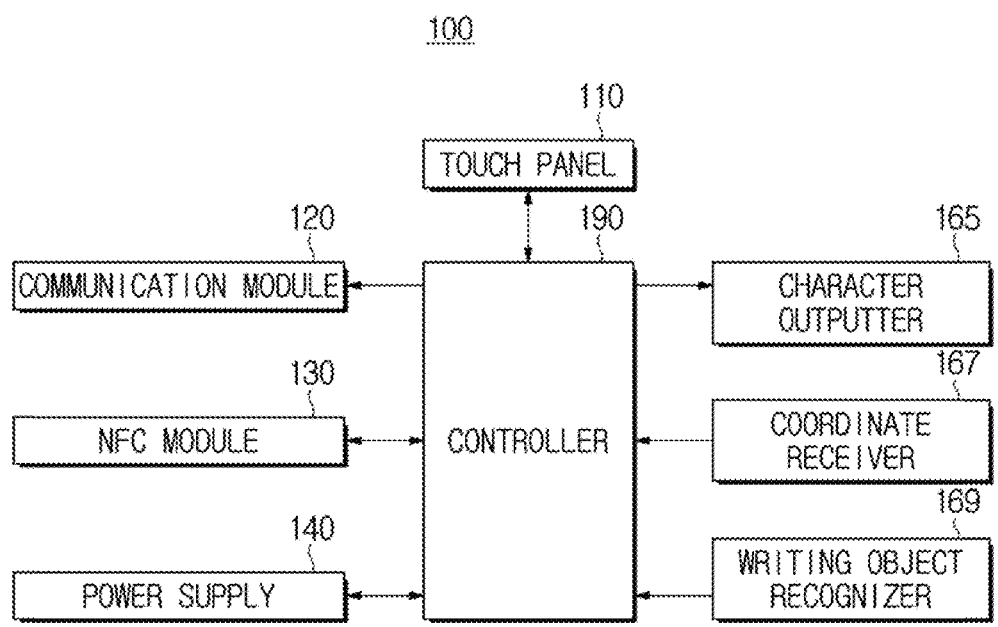
FIG. 5 is a block diagram of a touch screen in accordance with another exemplary embodiment.

FIG. 5 is a block diagram of a touch screen 100 in accordance with another exemplary embodiment.

The touch screen 100 may have an NFC function, receive touched coordinates from the electronic pen 500 and output characters corresponding to the touched coordinates.

As illustrated in FIG. 5, the touch screen 100 may include a touch screen touch panel 110, a communication module 120, an NFC module 130, a power supply 140, a character outputter 165, a coordinate receiver 167, a writing object recognizer 169, and a controller 190.

The communication module 120 is configured to establish wired/wireless communication. The communication module 120 may establish wireless communication outside the range of NFC, for example, via Bluetooth or Wi-Fi, and establish wired communication to transmit information converted into an electrical or optical signal via a communication line such as a pair cable, a coaxial cable, an optical fiber cable, etc.

The NFC module 130 is configured to establish NFC, and may establish communication, for example, via Bluetooth, Wi-Fi, etc.

The power supply 140 is configured to supply power and may supply power to the touch screen 100 under control of the controller 190.

The writing object recognizer 169 may recognize as a writing object an electronic pen 500 that transmits a writing object informing signal among a plurality of electronic pens 500.

When writing object informing signals are received from a plurality of electronic pens 500, the writing object recognizer 169 may select a writing object according to the order in which the writing object informing signals are received.

The coordinate receiver 167 may receive touched coordinates from the electronic pen 500.

The character outputter 165 may output characters corresponding to the touched coordinates received from the electronic pen 500 onto the touch screen touch panel 110.

The subordinate touch screen 400 may have a geomagnetic sensing function and an NFC function. After the subordinate touch screen 400 is powered on, when a touch input signal is received indicating a touch on a location on the touch panel 410 of the subordinate touch screen 400 by the electronic pen 500, touched coordinates of the electronic pen 500 that is in contact with the touch panel 410 of the subordinate touch screen 400 may be calculated based on preset coordinate data of each location.

The electronic pen 500 may have an NFC function. After the power switch 510 is on, the electronic pen 500 may be operated to take notes on the touch panel 410 according to a user's manipulation and transmit touched coordinates calculated by the subordinate touch screen 400 to the touch screen 100.

As illustrated in FIG. 8, the electronic pen 500 may include a power switch 510, a permanent magnet 520, an NFC module 530, a writing object informer 540, and a coordinate transmitter 560.

The power switch 510 may switch a power supply to an 'on' state or an 'off' state.

The permanent magnet 520 may be disposed adjacent to a touched location on the touch panel 410 of the subordinate touch screen 400 but is not limited thereto, so that the distance between the sensor module 420 of FIG. 10 and the permanent magnet 520 on the touch panel 410b may be minimized to improve the efficiency of geomagnetic sensing.

The NFC module 530 may be configured to establish NFC.

When the power supply is switched to the 'on' state, the writing object informer 540 may transmit a writing object informing signal to the touch screen 100 when an electronic pen and one of a plurality of subordinate touch panels 400 are disposed within a range of NFC.

The coordinate transmitter 560 may transmit the touched coordinates calculated by the subordinate touch screen 400 to the touch screen 100.

Figure 12:
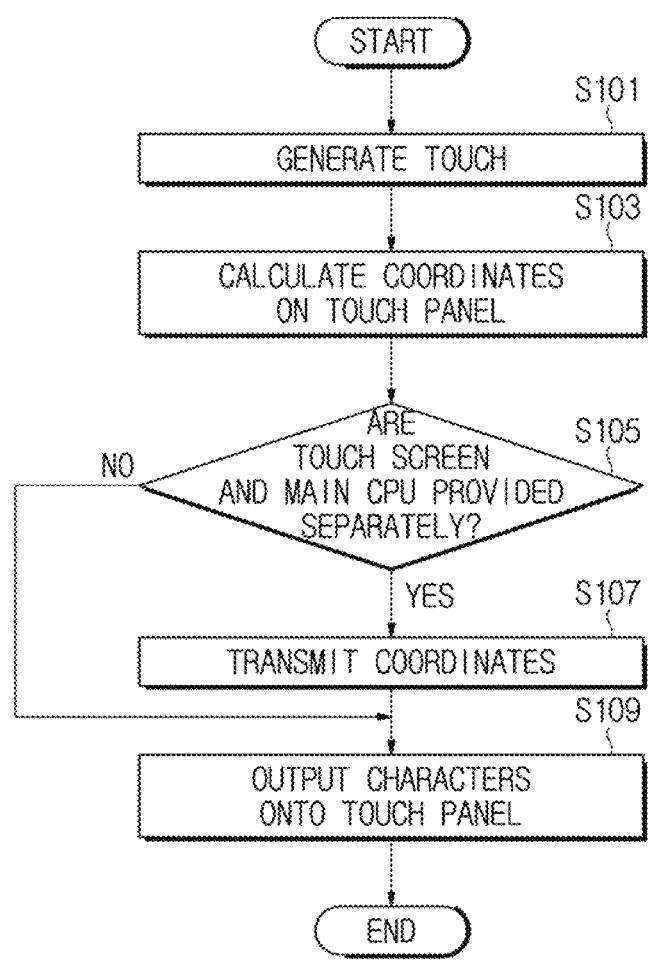
FIG. 12 is a flowchart of a method of controlling a touch screen apparatus in accordance with another exemplary embodiment.

FIG. 12 is a flowchart of a method of controlling a touch screen apparatus in accordance with an exemplary embodiment. An exemplary embodiment in which a touch screen apparatus includes a touch screen and a main CPU will be described below.

First, when a touch input signal is generated using the electronic pen 200 (operation S101), the touch screen 100 calculates touched coordinates representing a location on the touch panel 110 touched by the electronic pen 200 (operation S103).

For example, the touch screen 100 may calculate the touched coordinates of the electronic pen 200 on the touch panel 110 by comparing a touched location recognized by the sensor module 150 with preset coordinates of each location on the touch panel 110.

Then, when the touch screen 100 and the main CPU 300 that performs a function of outputting characters onto the touch screen 100 are provided separately, the touch screen 100 may transmit the touched coordinates calculated in operation S103 to the main CPU 300 via the NFC module 230 of the electronic pen 200 (operations S105 and S107).

In this case, the touched coordinates may be directly transmitted from the touch screen 100 to the main CPU 300.

Next, the main CPU 300 may output characters corresponding to the touched coordinates onto the touch panel 110 (operation S109).

When the touch screen 100 performs a function of outputting characters in operation S105, the touch screen 100 may output characters corresponding to the touched coordinates calculated in operation S103 onto the touch panel 110 (operation S109).

Figure 13:
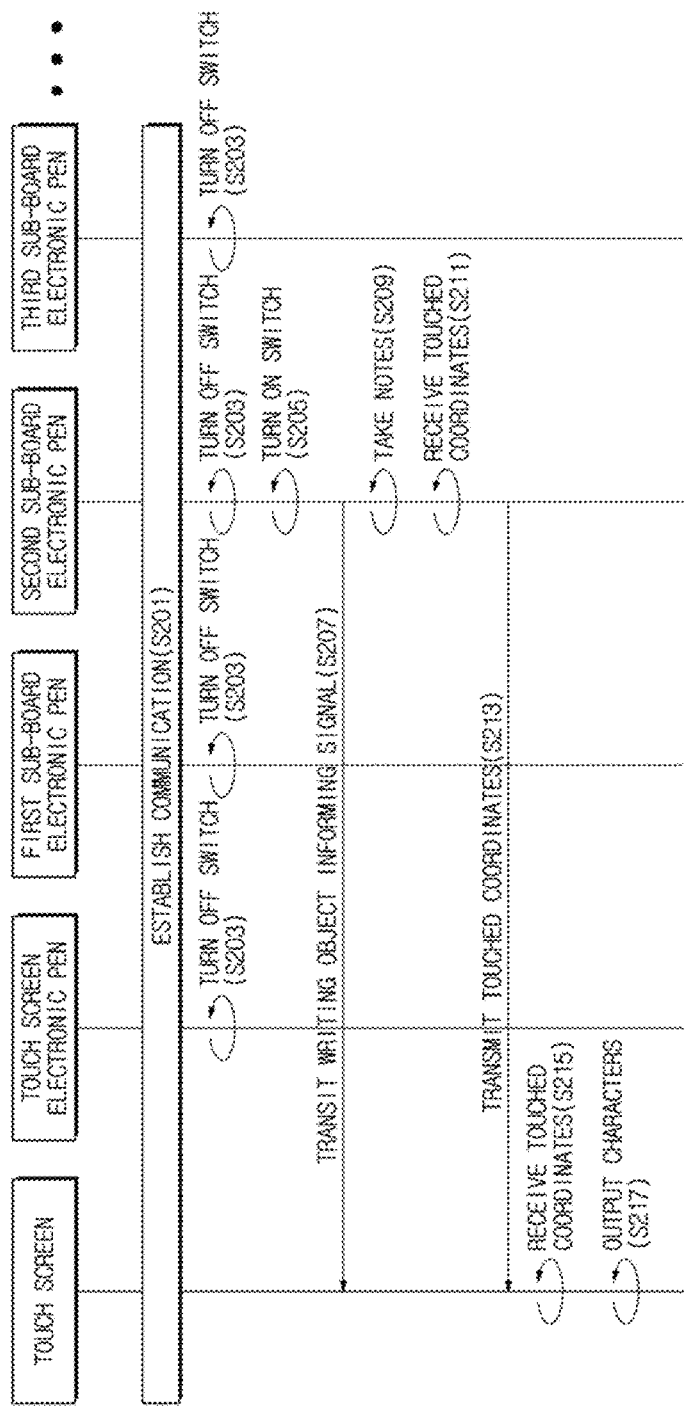
FIG. 13 is a flowchart of a method of controlling a touch screen apparatus in accordance with another exemplary embodiment.

FIG. 13 is a flowchart of a method of controlling a touch screen apparatus in accordance with another exemplary embodiment. An exemplary embodiment in which the touch screen apparatus includes a touch screen, a subordinate touch panel, and a main CPU will be described below.

First, communication may be established among the touch screen 100, the electronic pen 200, the main CPU 300, a subordinate touch panel, and a plurality of electronic pens 500 in the form of group to exchange data with one another (operation S201). That is, each of the touch screen 100, the electronic pen 200, the main CPU 300, the subordinate touch panel, and the plurality of electronic pens 500 may transmit data to or receive data from the other in a particular space, and may identify the other when each of them receives data from the other.

Next, the electronic pen 200 and the plurality of electronic pen 500 may be maintained to be switched off while being in a writing standby state (operation S203).

Next, one of the plurality of electronic pens 500, e.g., a second electronic pen of FIG. 11 or 13, may be switched to an 'on' state so as to take notes (operation S205).

Next, the switched-on electronic pen 500 may transmit a writing object informing signal to the touch screen 100 (operation S207). If the main CPU 300 outputs characters onto the touch screen 100, the electronic pen 500 may transmit the writing object informing signal to the main CPU 300.

Then, the electronic pen 500 may be operated to take notes on the touch panel 410 of the subordinate touch screen 400 (operation S209).

Next, when notes are taken using the electronic pen 500, the subordinate touch screen 400 may calculate and transmit touched coordinates of the electronic pen 500 that is in contact with the touch panel 410, and the electronic pen 500 may receive the touched coordinates (operation S211).

In this case, since the electronic pen 500 includes a permanent magnet and the subordinate touch screen 400 includes a sensor module having a geomagnetic sensing function, a magnetic field is formed between the electronic pen 500 and the subordinate touch screen 400 and thus a touched location on the touch panel 410 may be detected.

The subordinate touch screen 400 calculates the coordinates of a touched location on the touch panel 410 by comparing the detected touched location with preset coordinate data of each location.

In this case, the preset coordinate data of each location is obtained by setting the coordinates of each location on the touch screen 100 to correspond to the touch panel 410 of the subordinate touch screen 400, and may be scaled to the size of the touch screen 100 and then displayed when notes taken on the subordinate touch screen 400 are output onto the touch screen 100.

Next, the electronic pen 500 may transmit the calculated touch coordinates to the touch screen 100 (operation S213).

Next, the touch screen 100 may output characters corresponding to the received touched coordinates onto the touch panel 110 of the touch screen 100 (operations S215 and S217).

If the main CPU 300 outputs characters onto the touch screen 100, the electronic pen 500 may transmit the touched coordinates to the main CPU 300 and the main CPU 300 outputs characters onto the touch panel 110 of the touch screen 100 based on the touched coordinates, in operations S213 to S217 described above.

The touch screen 100 or the main CPU 300 described above may select as a writing object an electronic pen 500 that receives a writing object informing signal, and output characters based on the touched coordinates transmitted from the electronic pen 500.

If the touch screen 100 or the main CPU 300 receives writing object informing signals from a plurality of electronic pens 500, a writing object may be selected according to the order in which the writing object informing signals are received.

As is apparent from the above description, a touch screen apparatus in accordance with an exemplary embodiment has a geomagnetic sensing function and may be manufactured at low costs, compared to a touch screen apparatus according to the related art. The touch screen apparatus in accordance with an exemplary embodiment is capable of transmitting written contents between a plurality of subordinate touch panels and a touch screen and may be thus used in various places for meetings, educational seminars, etc.

Although exemplary embodiments have been shown and described, the present disclosure is not limited thereto and it would be appreciated by those skilled in the art that changes may be made to these exemplary embodiments without departing from the principles and spirit of the present disclosure, the scope of which is defined in the claims and their equivalents.

What is claimed is:

1. A touch screen apparatus comprising:
a touch screen having a geomagnetic sensing function and a near-field communication (NFC) function, and configured to calculate touched coordinates using a touch input signal when the touch input signal is generated as a location on a touch panel is touched by a touch screen electronic pen after the touch screen is powered on and to transmit the calculated touched coordinates to a touch screen electronic pen;
the touch screen electronic pen having an NFC function, and configured to take notes on the touch panel according to a user's manipulation and transmit the touched coordinates calculated by the touch screen to a main central processor; and
the main central processor having an NFC function, and configured to receive the touched coordinates from the touch screen electronic pen and output characters corresponding to the touched coordinates onto the touch panel.

2. The touch screen apparatus of claim 1, wherein the touch screen electronic pen comprises a permanent magnet, and
the touch screen comprises:
the touch panel;
a near field communicator configured to establish NFC;
a power supply to supply power;
a sensor having a geomagnetic sensing function, and configured to sense a touch using a magnetic field formed between the sensor and the permanent magnet of the touch screen electronic pen;
a coordinates calculator configured to calculate touched coordinates of the touch screen electronic pen that is in contact with the touch panel, based on preset coordinate data of each location; and
a memory configured to store coordinate data of each location on the touch panel and information related to the touch screen.

3. The touch screen apparatus of claim 1, wherein the main central processor comprises:
a near field communicator configured to establish NFC;
a coordinates receiver configured to receive the touched coordinates from the touch screen electronic pen; and
a character outputter configured to output characters corresponding to the touched coordinates onto the touch screen.

4. The touch screen apparatus of claim 1, wherein the touch screen electronic pen comprises:
a power switch configured to switch a power supply to an on-state or an off-state;
a permanent magnet disposed adjacent to the touched location on the touch panel;
a near field communicator configured to establish NFC; and
a coordinate transmitter configured to transmit the touched coordinates received from the touch screen to the main central processor.

* * * * *